US008640240B2

(12) United States Patent
Sagoo et al.

(10) Patent No.: US 8,640,240 B2
(45) Date of Patent: Jan. 28, 2014

(54) APPARATUS AND METHOD FOR USING INFORMATION ON MALICIOUS APPLICATION BEHAVIORS AMONG DEVICES

(75) Inventors: Kiran Pal Sagoo, Seongnam-si (KR); Kyung-im Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1244 days.

(21) Appl. No.: 11/656,982

(22) Filed: Jan. 24, 2007

(65) Prior Publication Data

US 2007/0192866 A1    Aug. 16, 2007

(30) Foreign Application Priority Data

Feb. 10, 2006  (KR) ......................... 10-2006-0013262

(51) Int. Cl.
  G06F 11/00   (2006.01)
  G06F 12/14   (2006.01)
  G06F 12/16   (2006.01)
  G08B 23/00   (2006.01)

(52) U.S. Cl.
  USPC .......................................................... 726/24

(58) Field of Classification Search
  USPC ..................................................... 726/22–26
  See application file for complete search history.

(56) References Cited

U.S. PATENT DOCUMENTS

| 6,775,780 | B1 * | 8/2004 | Muttik ............................. 726/24 |
| 7,047,293 | B2 * | 5/2006 | Motoyama et al. ............ 709/224 |
| 7,602,789 | B2 * | 10/2009 | Albrecht .................. 370/395.32 |
| 7,752,662 | B2 * | 7/2010 | Shulman et al. ................ 726/22 |
| 2002/0147858 | A1 | 10/2002 | Motoyama et al. |
| 2003/0200464 | A1 * | 10/2003 | Kidron .......................... 713/201 |
| 2003/0212902 | A1 | 11/2003 | Van der Made |
| 2004/0019832 | A1 * | 1/2004 | Arnold et al. ................... 714/38 |
| 2004/0143749 | A1 * | 7/2004 | Tajalli et al. .................. 713/200 |
| 2005/0086500 | A1 | 4/2005 | Albornoz |
| 2005/0108518 | A1 * | 5/2005 | Pandya .......................... 713/151 |
| 2005/0108562 | A1 | 5/2005 | Khazan et al. |
| 2006/0185018 | A1 * | 8/2006 | Saretto et al. .................... 726/25 |
| 2007/0113270 | A1 * | 5/2007 | Kraemer et al. .................. 726/4 |

FOREIGN PATENT DOCUMENTS

| JP | 2002-333996 A | 11/2002 |
| JP | 2003-122651 A | 4/2003 |
| JP | 2003-218949 A | 7/2003 |
| JP | 2003-256230 A | 9/2003 |
| JP | 2004-94405 A | 3/2004 |
| JP | 2004-287810 A | 10/2004 |
| JP | 2005-234661 A | 9/2005 |
| WO | WO 02/06928 A2 | 1/2002 |

OTHER PUBLICATIONS

Zhang et al., Intrusion Detection Techniques for Mobile Wireless Networks, 2003, Kluwer Academic Publishers.*
Communication (Extended European Search Report) issued in EP Application No. 07708802.9, dated Nov. 5, 2010.
Office Action issued on Apr. 5, 2011 by the Japanese Patent Office in counterpart Japanese Patent Application No. 2008-554130.

* cited by examiner

*Primary Examiner* — Kambiz Zand
*Assistant Examiner* — Jing Sims
(74) *Attorney, Agent, or Firm* — Sughrue Mion, PLLC

(57) ABSTRACT

A device for using information on malicious application behaviors is provided. The device includes a capability-monitoring unit that monitors application capabilities, a behavior-monitoring unit that monitors application behaviors, an mBDL-generating unit that generates a document in a formal language specifying the application capabilities and the application behaviors, and a controlling unit that controls execution of application using the formal language.

21 Claims, 10 Drawing Sheets

US 8,640,240 B2

APPARATUS AND METHOD FOR USING INFORMATION ON MALICIOUS APPLICATION BEHAVIORS AMONG DEVICES

CROSS-REFERENCE TO RELATED APPLICATION

This application is based on and claims priority from Korean Patent Application No. 10-2006-0013262 filed on Feb. 10, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to preventing malicious application behaviors, and more particularly, to using information on malicious application behaviors among devices.

2. Description of the Related Art

Behavior profiling/monitoring engine applications, commonly known as antivirus software, monitor the execution of the application, and record logs. Behavior-based antivirus software monitors malicious applications based on application behaviors. WholeSecurity, Finjan Software, and Proofpoint are companies providing behavior-based solutions. These solutions prevent the malicious applications by determining whether a process is malicious according to an algorithm, providing an engine that blocks application level behaviors, or machine learning and artificial intelligence.

In related art, the application vulnerability description language (AVDL), enterprise vulnerability description (EVDL), and open vulnerability and assessment language (OVAL) describe malicious application behaviors. The AVDL sets a standard by exchanging information on known vulnerabilities in a network. AVDL proposes a vulnerability between clients using the Hypertext Transfer Protocol (HTTP) and a gateway/proxy, and performs an attack. EVDL forms a, known data format in order to indicate the vulnerability of web applications. In addition, EVDL is a security markup language, and provides a guide for initial hazards and the probability of risks. OVAL is a language that determines the vulnerabilities of a computer system and setting issues. OVAL is an international information-security community-based standard providing information on how to check the vulnerabilities of computer systems, and whether the settings have been set.

Most computer systems today have antivirus software installed, which is provided by different vendors, and each is composed of different virus signature/patch formats. In addition, many different kinds of malware attacks cause damage to different applications in different platforms. The vulnerabilities of operating systems, system software, or application software components are susceptible to exploitation. Accordingly, interoperability is an important consideration.

AVDL specifies the stack of the application or "known vulnerability" of the component, e.g., operating system types, operating system versions, application server types, web server types, and database types. Here, AVDL specifies information on directory structures, Hypertext Markup Language (HTML) structures, legal-access points, and legal-response parameters. The EVDL schema is composed of elements such as metadata that contains basic information, profiles that classify the vulnerabilities of applications, analysis that contains information on source code vulnerabilities, detection information that detects the vulnerabilities of the application, and protection information that protects the application while running.

The aforementioned languages share, a known vulnerability. However, the committee for language standardization cannot stipulate that vulnerabilities must be specified in Extensible Markup Language (XML) format.

Large amounts of malware, such as viruses, are created regularly. Accordingly, a process of generating a patch to combat a virus, as illustrated in FIG. 1, is required.

FIG. 1 illustrates the implementation of a related art antivirus process. In operation 1, a virus attacks a known vulnerability of a user computer system. In operation 2, the user computer system reports the characteristics of the attack to a vendor. In operation 3, a virus code is then transmitted to an antivirus vendor. The antivirus vendor analyzes the sample virus code, and generates a patch or a signature. Once operation 3 has been completed, the vendor updates the database of the known vulnerability in operation 3'.

In operation 4, the antivirus vendor transmits the patch or the signature to a client computer so the client computer can update the antivirus signature. In addition, a document based on the aforementioned AVDL, EVDL, and OVAL is generated in operation 4'. The user computer downloads the antivirus software and prevents unauthenticated or malicious applications from running in operation 5.

FIG. 2 is a drawing illustrating whether a generated document protects known vulnerability. FIG. 2 illustrates that malicious software or a virus attacks the vulnerability of an authenticated application. Client 2 may inquire where the vulnerability of common vulnerability and exposure (CVE) lies. Client 2 may receive an AVDL, OVAL, or EVDL document, and share the document with client 1.

However, the vulnerability detailed in an XML document using AVDL, OVAL, or EVDL is a "known" vulnerability, and thus does not specify malicious behaviors. That is, it is difficult to protect the system using a "zero-hour protection" scheme. The zero-hour protection immediately blocks malicious software that poses a threat to the system. The aforementioned vulnerability description languages specify "known vulnerabilities", but do not specify malicious application "behaviors". In addition, the languages can be applied when a known vulnerability is shared, but are not effective in preventing the malicious application from spreading.

Related art description languages cannot check whether a vulnerability exists. Another disadvantage is that the generated XML documents are large.

Accordingly, documents in those languages may induce network load when exchanging, sharing, and parsing such documents, and be a problem for embedded systems having limited computing power and small amount of resources. Therefore, solutions to the aforementioned problems are required.

SUMMARY OF THE INVENTION

The present invention provides an apparatus and a method which exchange and use information on malicious application behaviors.

The present invention also provides an apparatus and a method which authenticate devices that communicate with each other, and monitor the malicious application behaviors thereamong.

According to an aspect of the present invention, there is provided a device for using information on malicious application behaviors, the device including a capability-monitoring unit that monitors application capabilities; a behavior-monitoring unit that monitors application behaviors; an mBDL-generating unit that generates a document in a formal language specifying the application capabilities and the application behaviors; and a controlling unit that controls execution of an application using the formal language.

According to another aspect of the present invention, there is provided a method of using information on malicious application behaviors, the method including monitoring application behaviors or application capabilities; generating a document in a formal language specifying the monitored application capabilities or the application behaviors; and controlling execution of an application using the generated formal language.

BRIEF DESCRIPTION OF THE DRAWINGS

The above and other features and aspects of the present invention will become apparent by describing in detail exemplary embodiments thereof with reference to the attached drawings, in which.

DETAILED DESCRIPTION OF EXEMPLARY EMBODIMENTS OF THE INVENTION

Figure 1:
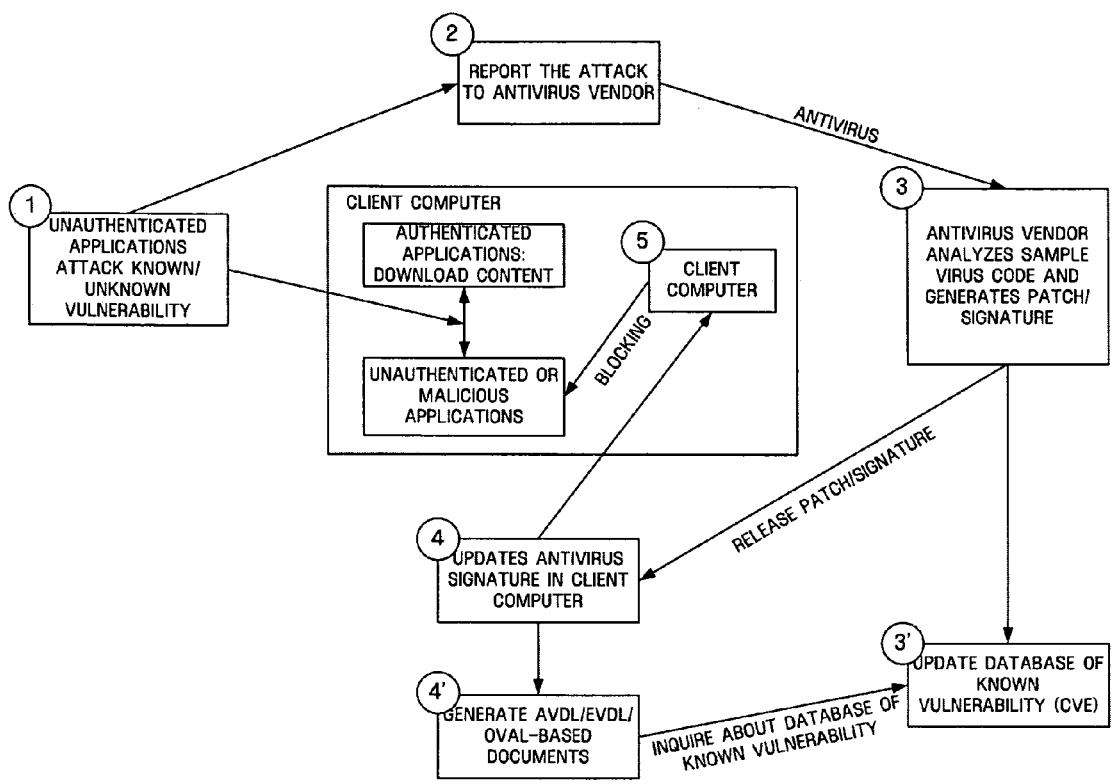
FIG. 1 illustrates the implementation of related art antivirus software.

Exemplary embodiments of the present invention will be described in detail with reference to the accompanying drawings.

Aspects and features of the present invention and methods of accomplishing the same may be understood more readily by reference to the following detailed description of the exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of user interfaces, methods, and computer program products according to exemplary embodiments of the invention.

It will be understood that each block of the flowchart illustrations, and combinations of blocks in the flowchart illustrations can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded into a computer or other programmable data processing apparatus to cause a series of operational steps to be performed in the computer or other programmable apparatus to produce a computer implemented process such that the instructions that execute in the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Malicious codes herein refer to malware that has harmful functions, and include viruses, hacking programs, and spyware. The harmful functions include performance degradation, data erasure, data change, and data exposure.

Figure 3:
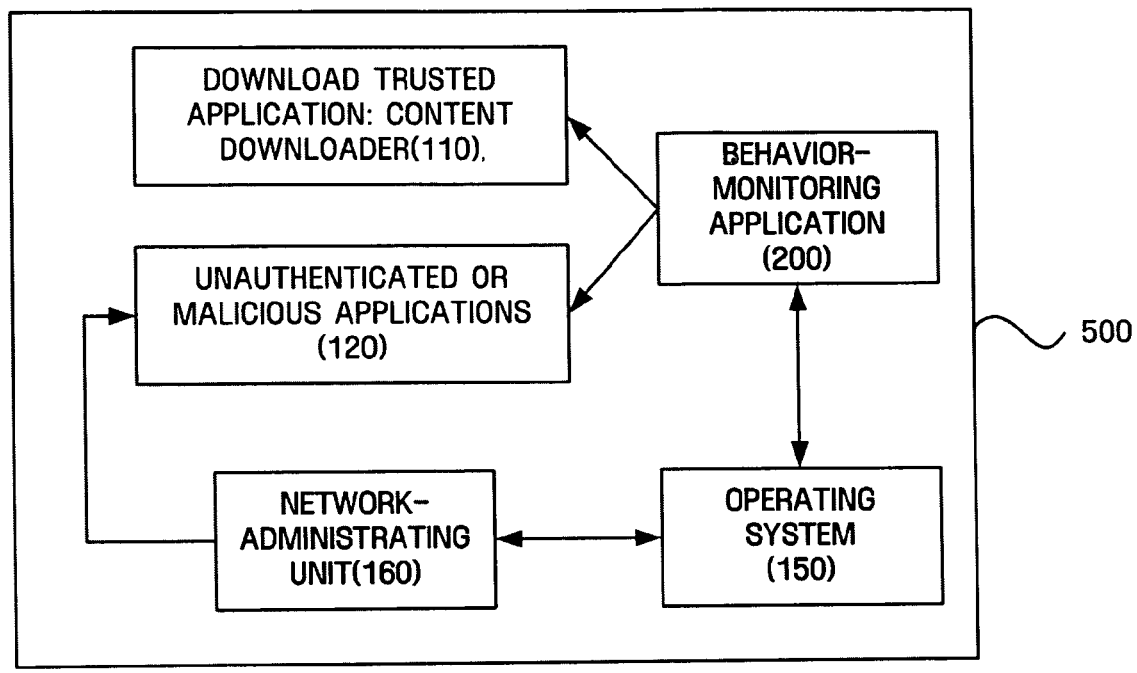
FIG. 3 illustrates a structure of a computer system according to an exemplary embodiment of the present invention.

FIG. 3 illustrates a structure of a computer system according to an exemplary embodiment of the present invention.

In addition to computer systems and laptop computers, a system 500 in FIG. 3 may be applied to embedded systems as well as mobile phones, MP3 players, Personal Data Assistants (PDAs), and Portable Media Players (PMPs). Although not shown in FIG. 3, hardware structure such as CPUs, RAMs, ROMs, and caches may be included to run the application. Moreover, libraries, drivers, and interfaces may be provided.

A behavior-monitoring application 200 proposed in the specification may be implemented in software or hardware. A trusted application 110 in a system 500 downloads content. In this case, if the downloaded content is an unauthenticated application or a malicious application 120, the behavior-monitoring application 200 may monitor and report the application or prevent it from running. The detailed execution processes of the behavior-monitoring application 200 will be described later.

A network-administering unit 160 downloads an application, transmits monitoring results to other vendors or devices, or receives data required to monitor application behaviors. An operating system 150 is in charge of the operation of the system 500, and may include an embedded Operating System (OS) or real-time OS.

The system may additionally have an input/output function, and may vary according to features and main purpose thereof.

Figure 4:
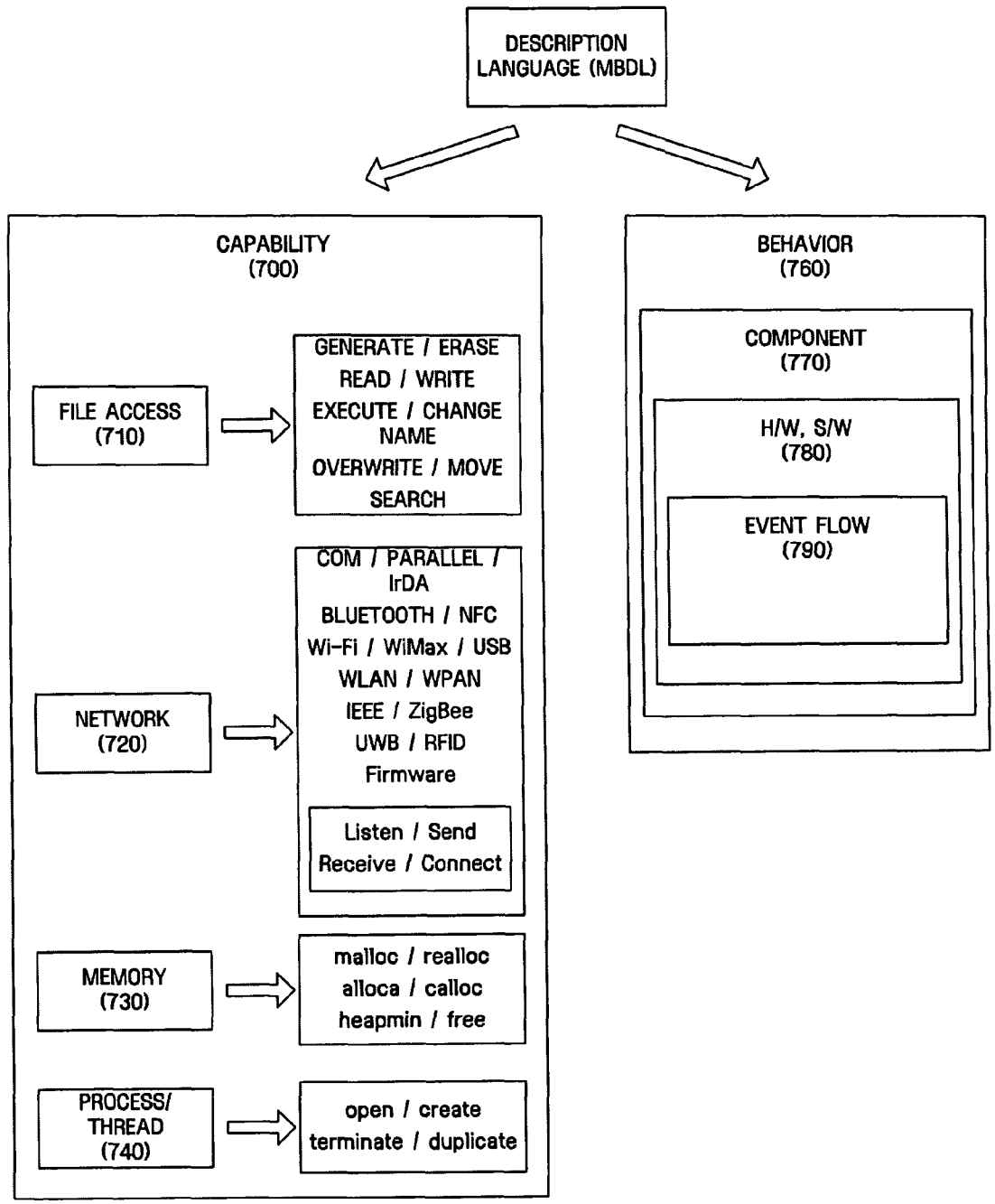
FIG. 4 illustrates a structure of an XML document that specifies a malicious behavior document according to an exemplary embodiment of the present invention.

The unauthenticated malicious application 120 is downloaded in the system 500 of FIG. 3. The behavior-monitoring application 200 monitors behaviors of the malicious application 120 at runtime. The behaviors of the application at runtime are documented in malicious behavior description language (mBDL) format, which is an XML-based template language. The mBDL specifies malicious applications behaviors. The main components thereof will be described FIG. 4 illustrates a structure of an XML document that specifies a malicious behavior document according to an exemplary embodiment of the present invention.

In order to describe malicious behaviors, the XML may be classified into a capability and a behavior. The mBDL illustrated in FIG. 4, includes a capability 700 and a behavior 760.

A capability element specifies the functional capability of an application, e.g., whether the application generates or erases a process or a thread. A capability element 700 includes a file access 710, a network 720, a memory 730, and a process/thread 740. The file access 710 specifies capabilities that a specific application can do to a file such as generating, erasing, reading, writing, or running it. For example, when the application provides a function to read file A and erase file B, the file access 710 can specify that.

The network 720 specifies what the application can do via a communication function, e.g., which communication port (COM, parallel, or IrDA) should be used or what should be selected in a wireless communication. Further, the network 720 specifies whether commonly used functions (listen, send, receive, or connect) are executed, e.g., the application uses 10936 port and transmits data using this port.

The memory 730 specifies whether commands such as malloc, realloc, alloca, calloc, heapmin, or free, which allocate the memory and restore it are executed. The process/thread 740 specifies whether the application generates, opens, terminates, or overwrites a process. For example, if the application generates or erases process A, the process/thread 740 can specify that.

The behavior 760 shows what kind of operation is executed in its elements. That is, the behavior 760 specifies application behaviors such as actions or events carried out while the application is running. Subordinate element includes a component 770, hardware, software 780, and an event flow 790. The component 770 includes hardware or software, and specifies execution behaviors of hardware or software. The hardware, software 780 specifies information on the event flow 790, and how the events are carried out in the hardware or software. The event flow 790 specifies the events occur while the malicious code is running.

Figure 5:
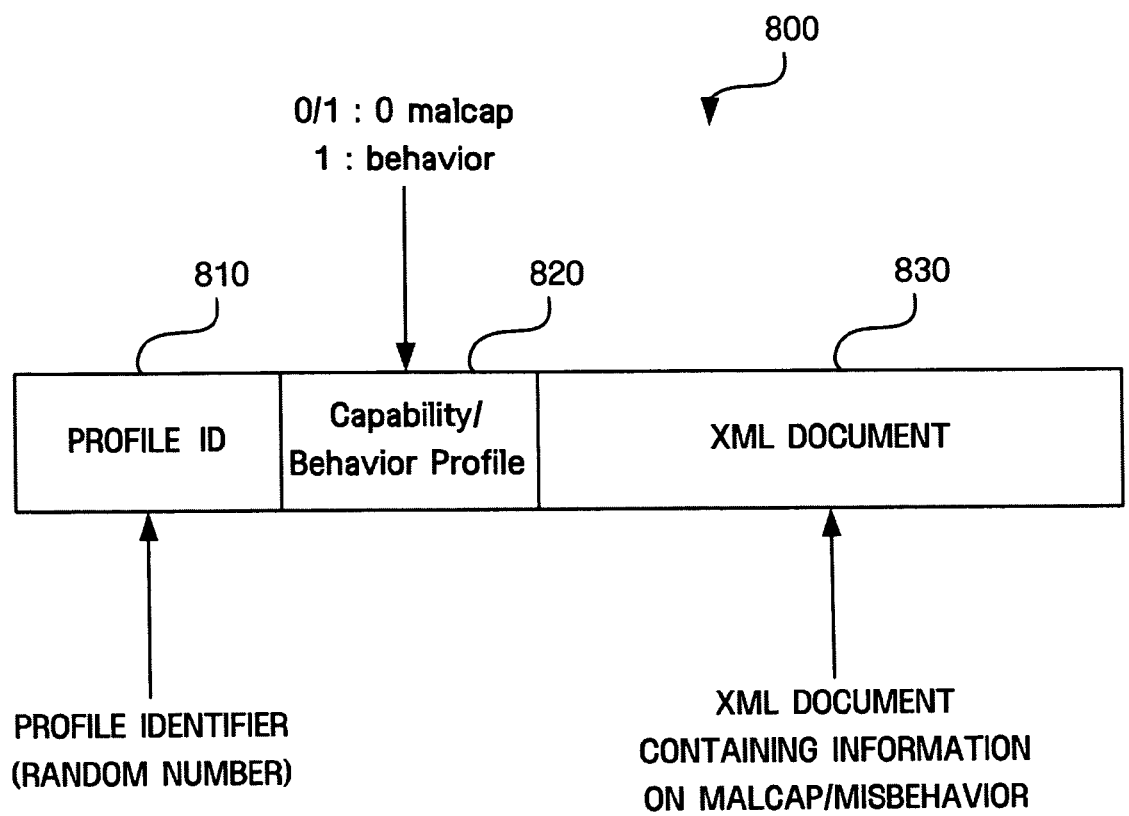
FIG. 5 illustrates a data unit 800 required to specify capabilities and behaviors based on the classification of FIG. 4 according to an exemplary embodiment of the present invention.

FIG. 5 illustrates a data unit 800 required to specify capabilities and behaviors based on the classification of FIG. 4 according to an exemplary embodiment of the present invention.

A first field is a profile identifier 810, and may be generated at random. A second field is a profile type 820 indicating whether it specifies a capability or a behavior, e.g. when 1 bit is allocated and the value comes out to be 0, the second field specifies a capability. When the value is 1, the second field specifies a behavior. A third field contains detailed information on the behavior or capability. FIG. 5 selects an XML document, which is used in most systems in formal languages.

Figure 6:
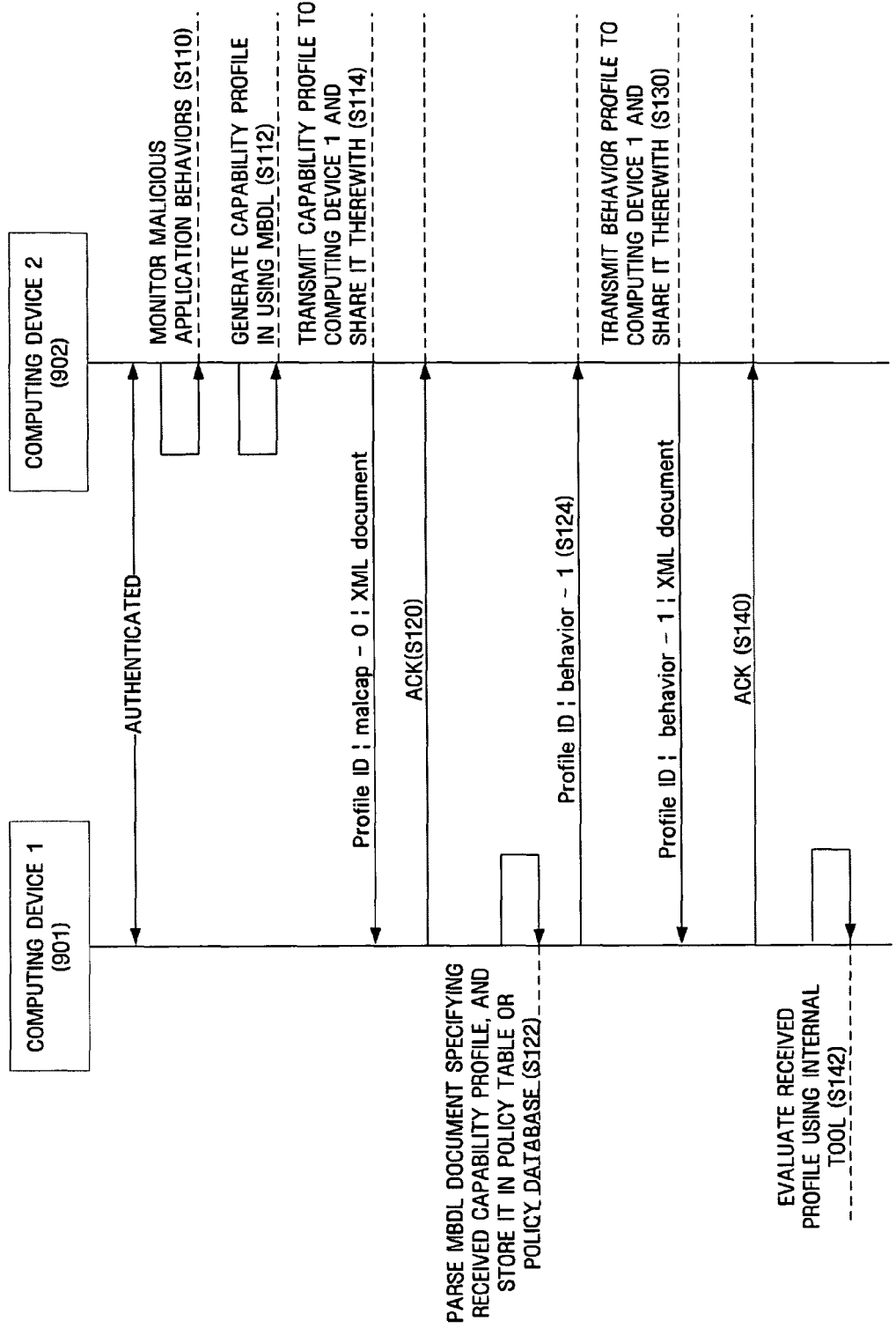
FIG. 6 illustrates a method of generating an mBDL according to an exemplary embodiment of the present invention, and exchanging it between two devices and protocols.

FIG. 6 illustrates a method of generating mBDL according to an exemplary embodiment of the present invention and exchanging it between two devices and protocol.

Computing devices in FIG. 6 are one exemplary embodiment, and may be applied to laptops, PDAs, or mobile phones as described above. A computing device 1 901 and a computing device 2 902 have been authenticated and are trusted. The authentication process may use trusted computing group.

The computing device 2 902 monitors malicious application behaviors, and generates an mBDL document (S110). Two mBDL documents such as a capability profile and a behavior profile may be generated. First, the computing device 2 902 generates the capability profile (S112), and transmits it to the computing device 1 901 in order to share therewith (S114). The capability profile provides information on "what" the malicious application does in a corresponding platform. Such information is crucial for other computing devices. The capability profile may have the same format illustrated in FIG. 5.

In an exemplary embodiment of the capability profile, a processor identifier 810 and a profile type (if the capability profile is 0) are set, and an XML document specifying the capability of the malicious application (malcap) is composed. A configuration of the XML document will be described later.

The computing device 1 901 transmits an ACK with respect to the received capability profile (S120). The computing device 1 901 parses an mBDL document containing the received capability profile, stores it in a policy table or a policy database, and parses it (S122). If the content of the policy table or policy database is different from the result of the parsing, the computing device 1 901 raises an objection, and may request the computing device 2 902 to stop the application (S124). This can be done by transmitting a data unit that contains the corresponding profile identifier.

The computing device 2 902 transmits the malicious application behaviors upon receipt of a response from the computing device 1 901 (S130). The behavior profile that will be transmitted may have the same configuration as the data unit in FIG. 5. A configuration of an XML document will be described later. The computing device 1 901 transmits the ACK (S140), and evaluates the received behavior profile using an internal tool.

Figure 7:
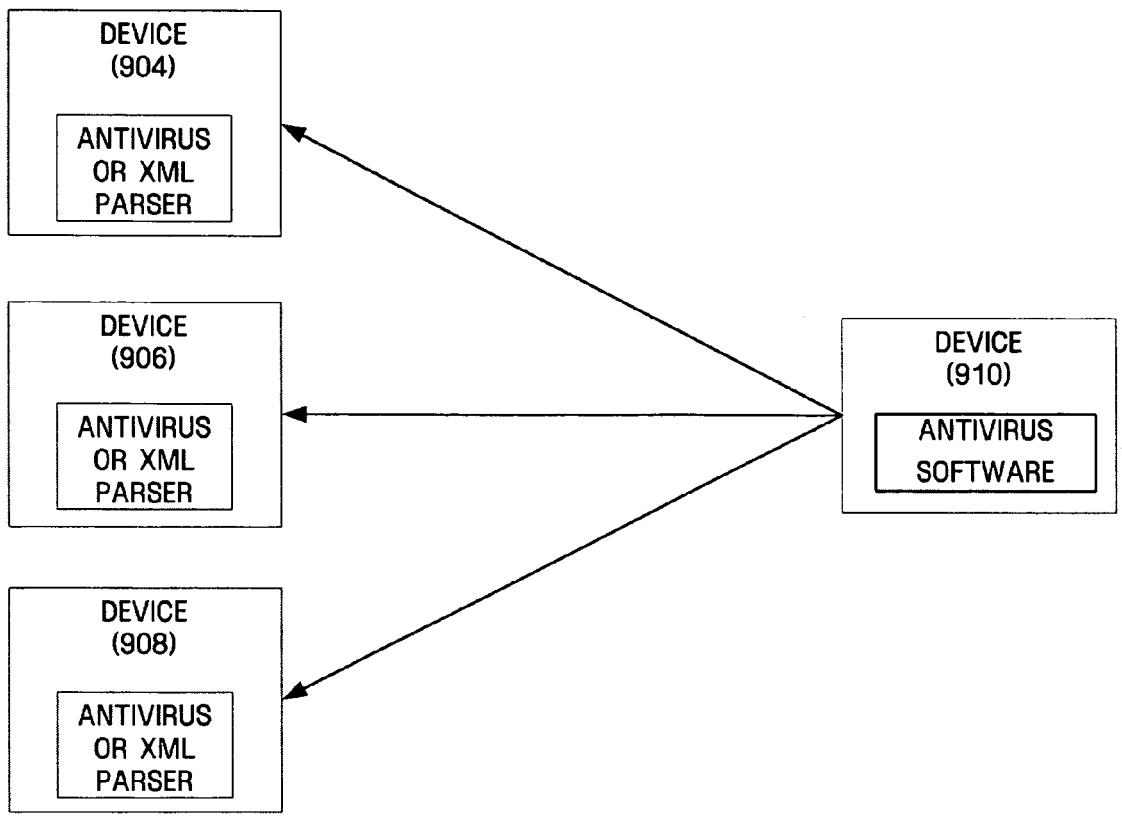
FIG. 7 illustrates a process of generating and sharing an mBDL among a plurality of devices according to an exemplary embodiment.

FIG. 7 illustrates a process of generating and sharing an mBDL among a plurality of devices according to an exemplary embodiment.

A device 910 having more computing power than devices 904, 906, and 908 has antivirus software with more powerful functions installed. The device 910 can monitor malicious application behaviors using the installed software. Once monitoring has been performed, an mBDL file is generated and transmitted to the devices 904, 906, and 908. The devices 904, 906, and 908 have less computing power than the device 910, and may have a function to parse the received mBDL file or provide a function to work as an antivirus that prevents the malicious applications from running. Accordingly, the devices 904, 906, and 908 can prevent the malicious applications from running by generating an mBDL document that specifies capabilities and behaviors in a specific device and sharing it with other devices.

Figure 2:
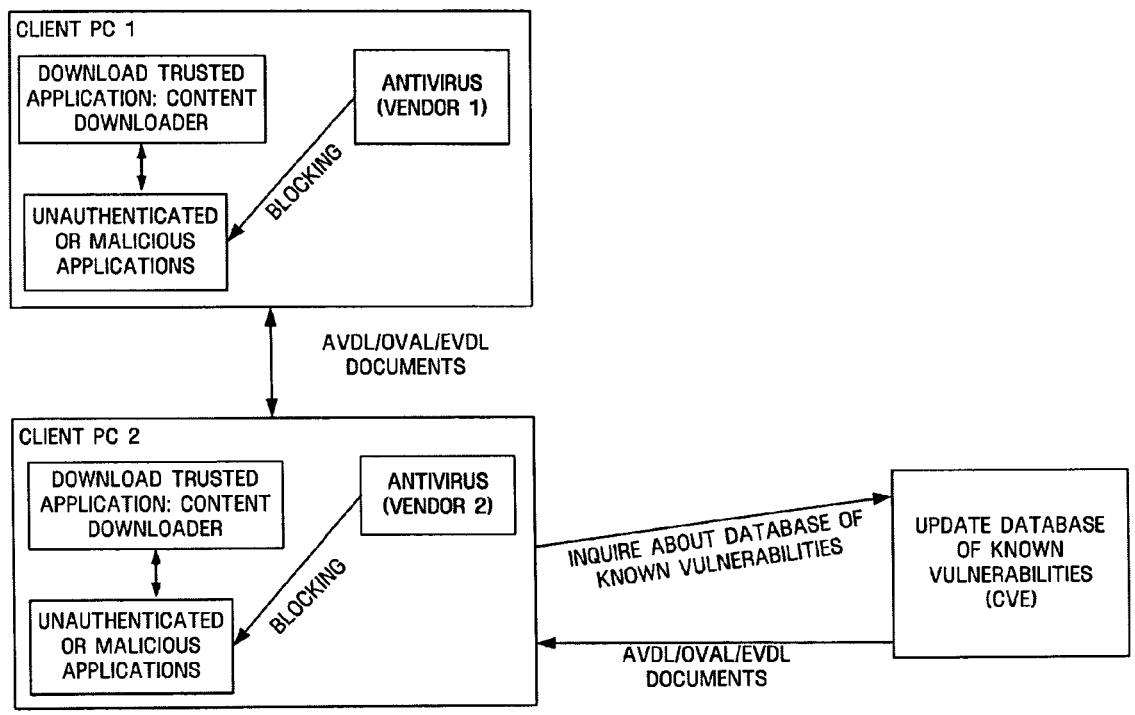
FIG. 2 is a drawing illustrating whether a generated document protects against a known vulnerability.

The term "module" described with reference to FIG. 2A relates to, but is not limited to, a software or hardware component, such as a Field Programmable Gate Array (FPGA) or an Application Specific Integrated Circuit (ASIC), which executes certain tasks. A module may be configured to reside in the addressable storage medium, and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Hereinafter, a filtering interface-provision method according to an exemplary embodiment of the present invention will be described in detail with reference to FIGS. 4 to 8.

Figure 8:
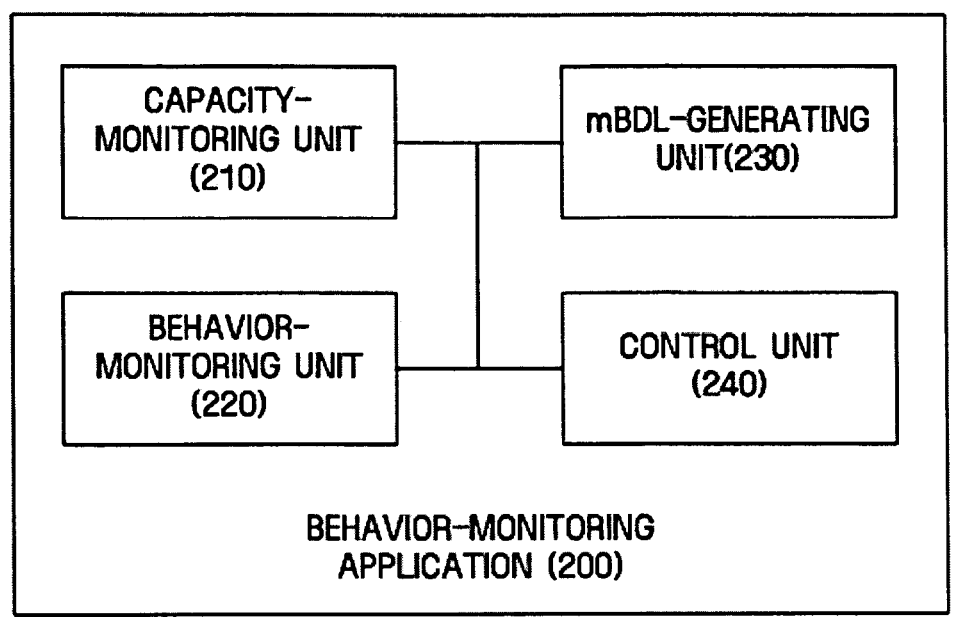
FIG. 8 illustrates a configuration of behavior-monitoring application according to an exemplary embodiment of the present invention.

FIG. 8 illustrates a configuration of behavior-monitoring application according to an exemplary embodiment of the present invention.

A capability-monitoring unit 210 monitors malicious application capabilities, i.e., files accessed or work carried out. A behavior-monitoring unit 220 monitors malicious application behaviors, i.e., it checks whether the behavior is based on hardware or software. The mBDL-generating unit generates an XML document according to the monitoring results of the capability-monitoring unit 210 and behavior-monitoring unit 220. This document can be shared with other devices. A control unit 240 determines whether the application contains a malicious code using the generated XML document, and controls the execution of the application.

Figure 9:
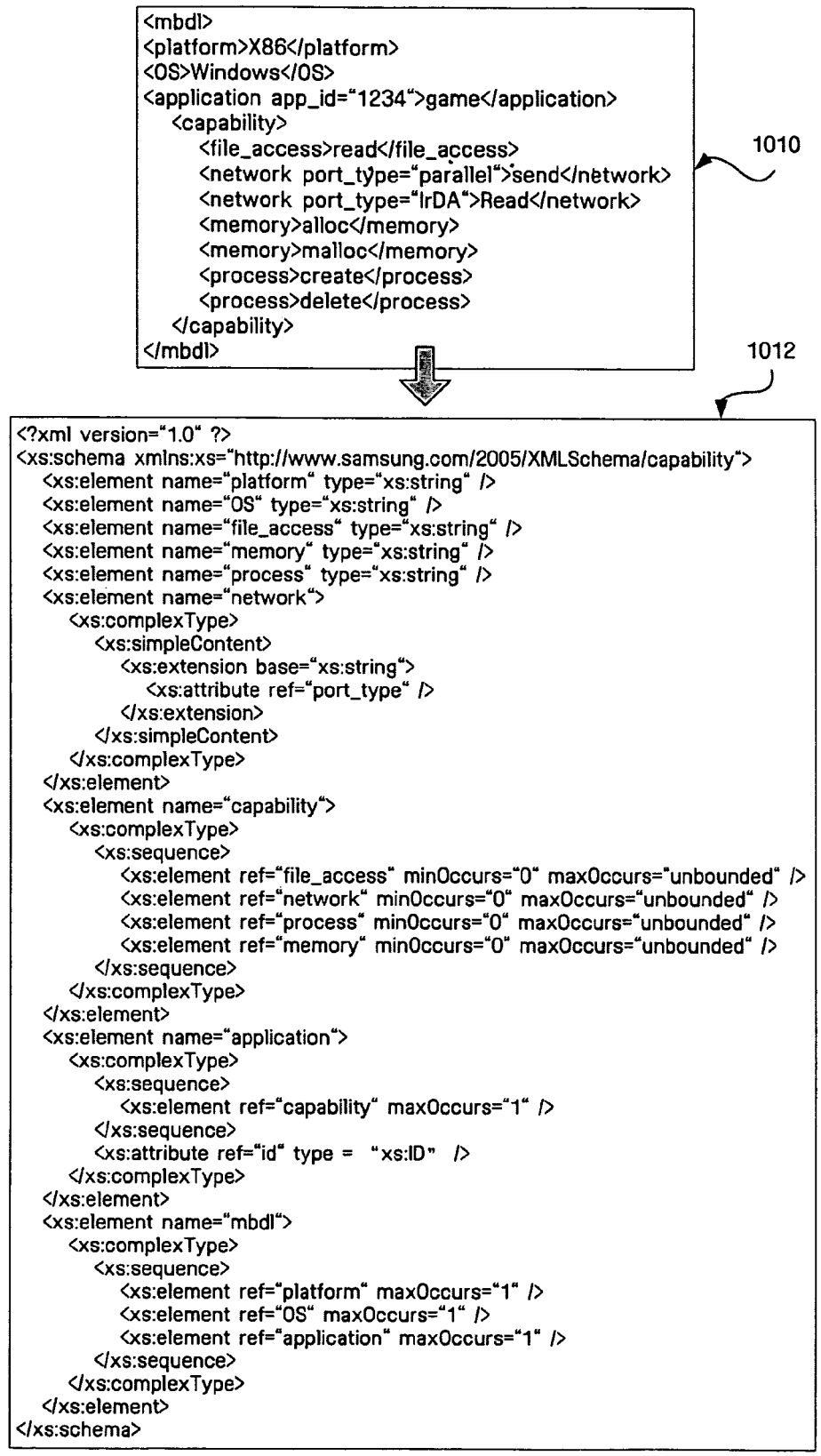
FIG. 9 illustrates a configuration of an mBDL document that is generated once a capability-monitoring unit has monitored malicious applications.

FIG. 9 illustrates a configuration of an mBDL document that is generated once a capability-monitoring unit has monitored malicious applications.

Numeral 1010 shows elements that go into an mBDL capability. Elements "file_access", "network", "memory", and "process" specify the aforementioned capabilities. Numeral 1012 illustrates an example of an mBDL document created according to the listed elements in numeral 1010.

Figure 10:
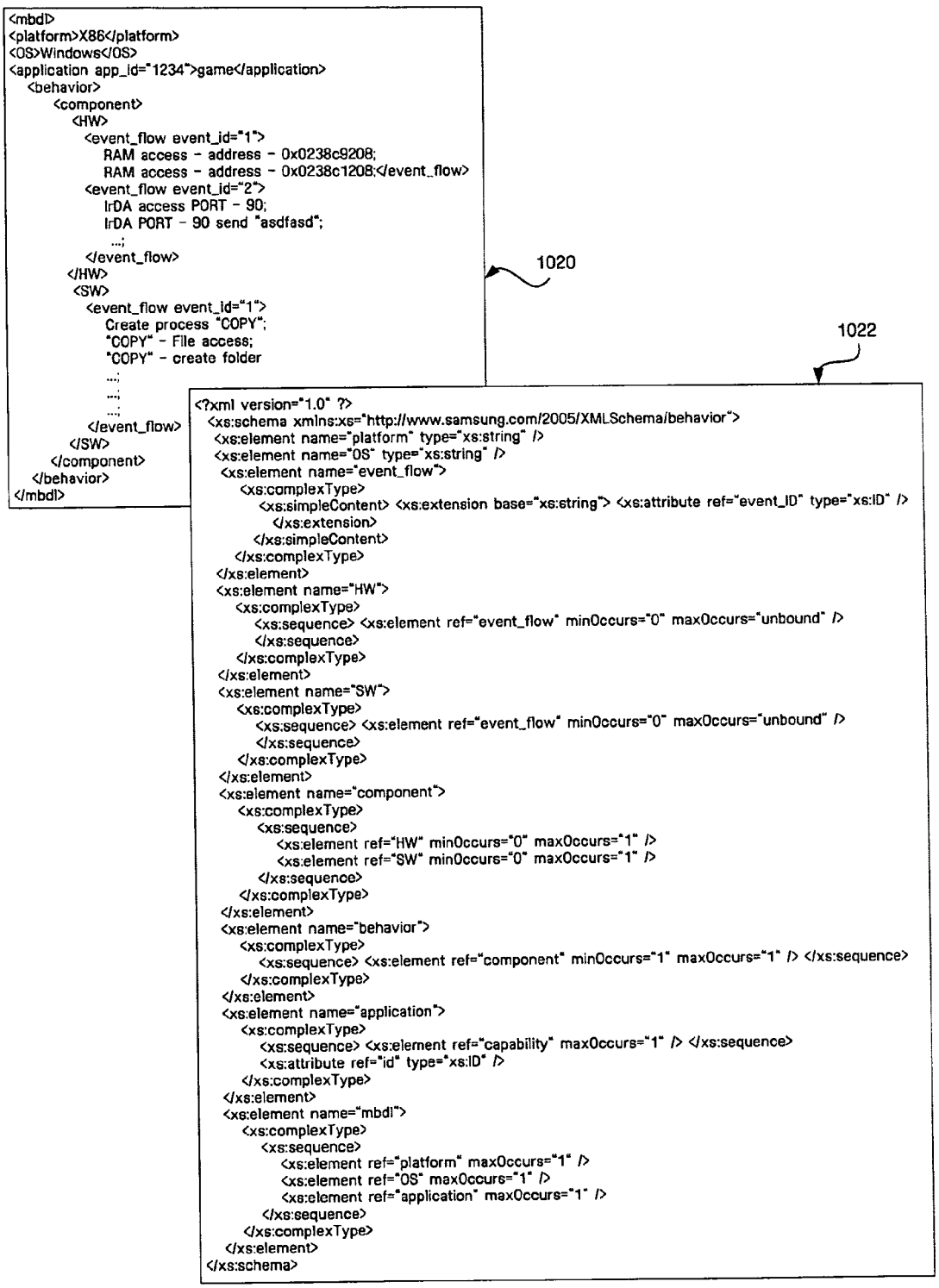
FIG. 10 illustrates a configuration of an mBDL document that is generated once capability-monitoring unit has monitored malicious applications.

FIG. 10 illustrates a configuration of an mBDL document that is generated once capability-monitoring unit has monitored malicious applications.

In 1020, elements that go into an mBDL capability are shown. In 1020 an event flow of malicious applications is monitored, and hardware and software using HW and SW tags are specified. In 1022, an example of an mBDL document created according to the listed elements in numeral 1020 is illustrated.

Information on malicious applications can be shared via common document form among vendors or devices having different platforms via the aforementioned mBDL. In addition, since suspected application behaviors may be evaluated in advance using capability elements, time required to report the malicious behaviors can be saved. Further, a profile of the malicious applications can be shared among trusted devices, and the application behaviors can be evaluated by devices having less computing power as long as they have a function to monitor or parse an XML document. Accordingly, an overall behavior-monitoring application is not to be installed.

As described above, according to an apparatus and method for using information of malicious application behaviors among devices, the following effects can be anticipated.

First, information on malicious applications can be shared among different devices manufactured by different vendors.

Second, a device having a parsing function can prevent malicious applications from running.

The exemplary embodiments of the present invention have been explained with reference to the accompanying drawings, but it will be apparent to those skilled in the art that various modifications and changes may be made thereto without departing from the scope and spirit of the invention. That is, a digital device that stores the broadcast content has been described as an example of a filtering interface according to exemplary embodiments of the present invention. However, the filtering interface provision method may be applied when a menu is filtered according to user preferences and displayed in digital devices storing digital content such as computers, PDAs, PMPs, mobile phones, and digital broadcasting receivers. Therefore, it should be understood that the above exemplary embodiments are not restrictive but illustrative in all aspects.

What is claimed is:

1. A device for using information on malicious application behaviors, the device comprising:
   a capability-monitoring unit that monitors application capabilities of a malicious application;
   a behavior-monitoring unit that monitors application behaviors of the malicious application;
   an a malicious Behavior Description Language (mBDL)-generating unit that generates a document in a formal language specifying the monitored application capabilities and the monitored application behaviors;
   a controlling unit that controls execution of the malicious application using the generated document in the formal language; and
   a network-administering unit that transmits the document in the formal language, which is generated in the mBDL-generating unit, to other devices,
   wherein at least one of the capability-monitoring unit, the behavior-monitoring unit, the mBDL-generating unit, and the controlling unit is implemented as a hardware processor,
   wherein the application is a previously generated malicious application received by the device.

2. The device of claim 1, wherein the application capabilities refer to utilizing or controlling resources of the device.

3. The device of claim 2, wherein the resource of the device comprises at least one of a file, a network, a memory, and a process.

4. The device of claim 1, wherein the application behaviors comprise information on work carried out by the application in the device.

5. The device of claim 4, wherein the information on the work comprises information on the execution of one of the components, hardware, and software of the device.

6. The device of claim 1, wherein the formal language is generated using Extensible Markup Language (XML).

7. A method of using information on malicious application behavior in a device, the method comprising:
   monitoring, by the device, at least one of application behaviors and application capabilities of a malicious application;
   generating, by the device, a document in a formal language specifying the at least one of the monitored application capabilities and the application behaviors;
   controlling, by the device, execution of the malicious application using the generated document in the formal language; and
   transmitting the generated document in the formal language to other devices,
   wherein the application is a previously generated malicious application received by the device.

8. The method of claim 7, wherein the application capabilities comprise the capability of the application to utilize or control resources of the device.

9. The method of claim 8, wherein the resources of the device comprise at least one of a file, a network, a memory, and a process.

10. The method of claim 7, wherein the application behaviors comprise information on work carried out by the application in the device.

11. The method of claim 10, wherein the information on the work comprises information on the execution of one of the components, hardware, and software of the device.

12. The method of claim 7, wherein the formal language is generated using Extensible Markup Language (XML).

13. A method of using information on malicious application behaviors in a device, the method comprising:
   receiving, by the device from another device, data that contains a document in a formal language specifying monitored application capabilities and monitored application behaviors of a malicious application;
   extracting, by the device, information on at least one of the application capabilities and the application behaviors by parsing the received data; and
   controlling, by the device, execution of the malicious application according to the extracted information,
   wherein the monitored application capabilities and the monitored application behaviors are determined at runtime of the malicious application.

14. The method of claim 13, wherein the application capabilities comprise the capability of the application to utilize or control resources of the device.

15. The method of claim 14, wherein the resources of the device comprise at least one of a file, a network, a memory, and a process.

16. The method of claim 13, wherein the application behaviors comprise information on work carried out by the application in the device.

17. The method of claim 16, wherein the information on the work comprises information on the execution of one of the components, hardware, and software of the device.

18. The method of claim 13, wherein the document is generated by a monitoring device after the monitoring device receives the application.

19. The method of claim 13, wherein:
   the extracting comprises parsing the received data and storing the parsed data in a policy table or a policy database; and
   the controlling comprises stopping execution of the application when content of the policy table or the policy database is different as a result of the parsing and the storing.

20. The method of claim 13, wherein the extracting comprises parsing the received data and storing the parsed data in a policy table or a policy database.

21. The method of claim 13, wherein the other devices are a plurality of user terminals in a network.

* * * * *